US012400566B2

(12) United States Patent
Staten et al.

(10) Patent No.: US 12,400,566 B2
(45) Date of Patent: Aug. 26, 2025

(54) FACTORY CALIBRATION MEASUREMENT DATA

(71) Applicant: Hewlett-Packard Development Company, L.P., Spring, TX (US)

(72) Inventors: Gregory G. Staten, Spring, TX (US); Jennifer L. Cook, Spring, TX (US); Syed S. Azam, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 18/529,749

(22) Filed: Dec. 5, 2023

(65) Prior Publication Data

US 2024/0105088 A1 Mar. 28, 2024

Related U.S. Application Data

(63) Continuation of application No. 17/616,015, filed as application No. PCT/US2019/053231 on Sep. 26, 2019, now Pat. No. 11,837,126.

(51) Int. Cl.
*G09G 5/10* (2006.01)
*G09G 3/00* (2006.01)
*G09G 5/00* (2006.01)

(52) U.S. Cl.
CPC ............ *G09G 3/006* (2013.01); *G09G 5/006* (2013.01); *G09G 2320/0666* (2013.01); *G09G 2320/0693* (2013.01)

(58) Field of Classification Search
CPC .................. G09G 3/006; G09G 5/006; G09G 2320/0666; G09G 2320/0693
USPC ........................................................ 345/690
See application file for complete search history.

(56) References Cited

U.S. PATENT DOCUMENTS

| | | | | |
|---|---|---|---|---|
| 6,559,826 | B1 | 5/2003 | Mendelson et al. | |
| 8,471,496 | B2 | 6/2013 | Knapp | |
| 8,643,662 | B2 | 2/2014 | Tran et al. | |
| 9,047,807 | B2 | 6/2015 | Kwong et al. | |
| 2003/0034941 | A1 | 2/2003 | Janssen et al. | |
| 2008/0036742 | A1* | 2/2008 | Garmon | G06F 3/0418 345/173 |
| 2010/0013855 | A1 | 1/2010 | Allen et al. | |
| 2011/0062874 | A1 | 3/2011 | Knapp | |
| 2013/0016081 | A1 | 1/2013 | Park et al. | |
| 2013/0027418 | A1 | 1/2013 | Tryndin et al. | |
| 2013/0169700 | A1* | 7/2013 | Park | G01J 3/0264 345/690 |

(Continued)

FOREIGN PATENT DOCUMENTS

| | | | |
|---|---|---|---|
| CN | 108538239 | A | 9/2018 |

*Primary Examiner* — Jonathan M Blancha
(74) *Attorney, Agent, or Firm* — Quarles & Brady LLP

(57) ABSTRACT

An example display system includes a load engine and a calibration engine. The load engine causes an inquiry for current calibration measurement data and retrieves factory calibration measurement data when the current calibration measurement data is unavailable. The calibration engine receives a target set of display characteristics, generates a color profile from a native panel performance representation to operate a display according to the target set of display characteristics, and causes adjustment of a display according to a difference between the target set of display characteristics and the native panel performance representation using the generated color profile.

20 Claims, 9 Drawing Sheets

(56) References Cited

U.S. PATENT DOCUMENTS

| | | | | |
|---|---|---|---|---|
| 2014/0132778 | A1 | 5/2014 | Holub | |
| 2015/0261966 | A1* | 9/2015 | Mensch | H04L 63/0876 713/189 |
| 2015/0277840 | A1* | 10/2015 | Ninan | G09G 5/026 345/589 |
| 2019/0164519 | A1 | 5/2019 | Olson et al. | |
| 2019/0213974 | A1* | 7/2019 | Marcu | G09G 5/06 |
| 2019/0251929 | A1* | 8/2019 | Fossati | G01J 3/463 |
| 2019/0265937 | A1 | 8/2019 | Kato et al. | |

* cited by examiner

FACTORY CALIBRATION MEASUREMENT DATA

CROSS-REFERENCE TO RELATED APPLICATION

This application is a continuation of U.S. application Ser. No. 17/616,015 filed on Dec. 2, 2021, which is a U.S. National Phase of PCT Application No. PCT/US2019/053231 filed on Sep. 26, 2019, the entire contents of which are incorporated herein by reference.

BACKGROUND

Images are processed for use with computing machines, such as a display device or a print apparatus. A display device, for example, may produce a visual representation of an image by operating light-emissive circuitry represented as a number of pixels based on processed image data. A display device may be limited by a range of colors producible by the number of pixels.

DETAILED DESCRIPTION

Figure 1:
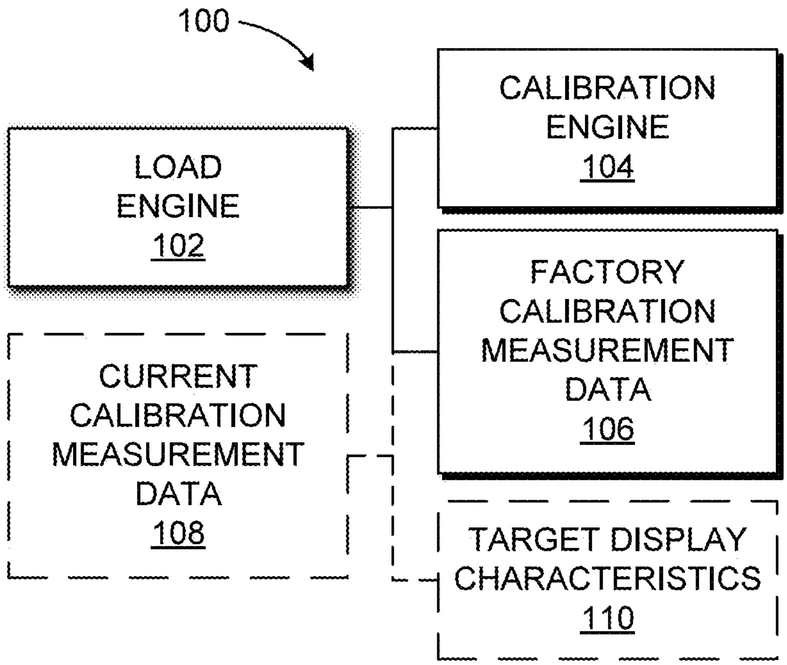
FIGS. 1 and 2 are block diagrams depicting example display systems.

In the following description and figures, some example implementations of display apparatus, display systems, and/or methods of calibrating a display device are described. A display device presents (e.g., displays) an image on a panel using color data (e.g., such as red, green, and blue (RGB) channel data) to determine a color to display for every pixel on the panel. Colors displayed by a panel are entirely dependent on the color characteristics of the display panel. For liquid crystal display (LCD) panels, color characteristic information may include spectral output of the backlight and the tone of the color filters applied on the top of the grayscale liquid crystals. These characteristics differ from panel to panel, resulting in colors often looking very different on one computer monitor or television as compared to another.

To address this inconsistency, a display device can be calibrated to result in a consistent, predictable color response. Some displays are calibrated in the factory and some displays also support recalibration by the user. User calibration may allow a user to adjust the default display color configuration to achieve a particular desired appearance. As examples, the white point (color of white) may be changed to a preferred value, the grayscale response or electro-optical transfer function (EOTF) may be adjusted to the ambient lighting in the environment of the display device, or a color configuration may be generated that matches the color configuration of a different device, such as a mobile phone.

In order to calibrate a display, a measurement instrument (such as a tristimulus colorimeter or spectroradiometer) is placed in front of the screen, color patterns are generated on the display panel, and the instrument reads and records the measurements at the time of the color patterns. These measurements provide a characterization of the display panel's performance, such as in the form of tuple sets. An example tuple set may be a color value for one of each color channel. The example tuple may be comparable to the color input tuple used when generating a corresponding measurement pattern. For example, the measurement data may be stored as an RGB triplet or an XYZ tristimulus output value. Indeed, the measurement data may be represented by a set of tristimulus values and a set of measured output tristimulus values for each input values corresponding to specific output value.

After a sufficient number of measurements are made, the measurement data is processed, and a color profile is generated. For example, the display may be measured in percentile linear or non-linear steps, such as at 100% of the color channel values, 80% of the color channel values, 60%, etc. The target gamut of the desired display characteristics may be calculated from the measurement data and those calculation may be represented in a data structure, such as a look up table (LUT) and/or matrix in a color profile. A color profile defines how a display's hardware is to operate in a color space (e.g., a range of colors defined by a triangular intersection of the three additive color primaries). The color profile may define a gamut, a white point, and a luminance A color profile may include a 1D or 3D LUTs and a matrix multiplier. In some examples, the color calibration profile may take the form of a pre-lookup-table ("Pre-LUT"), a multiply matrix (e.g., 3×3), and a post-LUT. In other examples, the color calibration profile may take the form of a shaper LUT followed by a three-dimensional ("3D") LUT. A color profile may constrain the display to operate in a standard color space or in a customized color space.

In every instance, calibration requires a baseline of measurements of the screen. While the equipment used at the factory is typically quite expensive, inexpensive colorimeters have been developed making user calibration possible, but such inexpensive colorimeters may not be as precise as the instruments used during factory calibration.

Factory calibration data may be erased from the memory during the factory display validation process. The present disclosure suggests storing calibration data from the factory calibration process on memory for future retrieval, either memory integral to the display device or available from an online or cloud service. Factory personnel may operate a factory calibration module to input data gleaned from manual testing of luminosity range capabilities of each individual display onto a memory resource integrated with the display device, such as scaler memory. Host-based calibration software may read back the measurement data from the internal memory, such as via a universal serial bus (USB) connection to the display device. In other examples, factory personnel may cause the measurements to be uploaded from the factory to a cloud-accessible database and associated with the display serial number or other identifier specific to the display device (or display model). In that example, the measurements may be downloaded by the host-based calibration software via a secure connection to the cloud-accessible database upon authorized request from the display device (e.g., by an authorized user).

Various examples described below relate to calibrating a display device using a color profile generated from factory calibration measurement data. By storing calibration measurements performed during factory calibration, the factory calibration measurement data may be used to generate new display color presets. In this manner, new calibrations can be performed and new color profiles can be created without an external measurement instrument.

Figure 2:
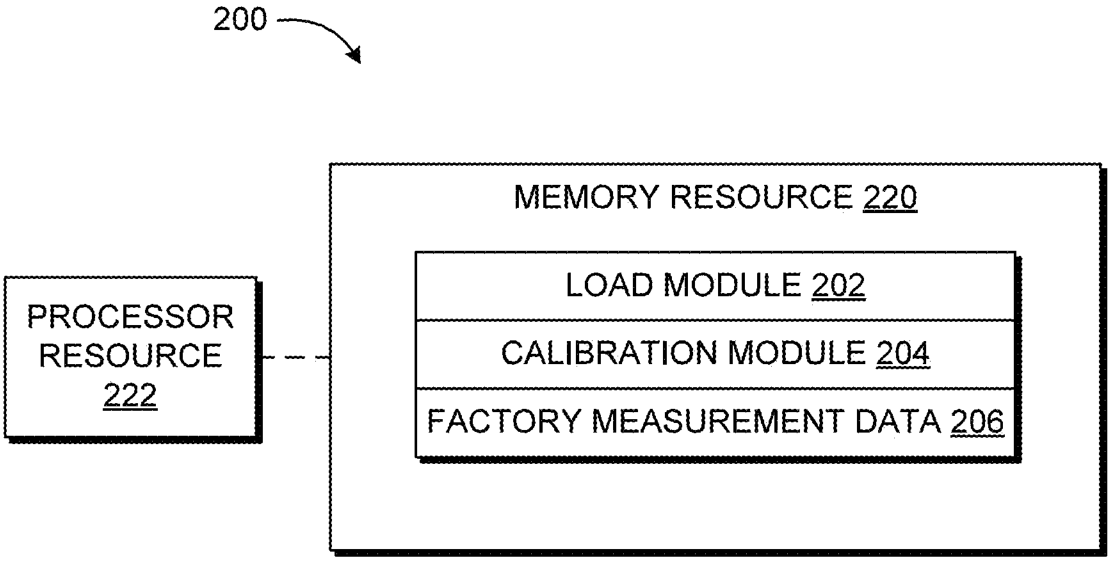

FIGS. 1 and 2 are block diagrams depicting example display systems 100 and 200. Referring to FIG. 1, the example display system 100 of FIG. 1 generally includes a load engine 102 and a calibration engine 104. In general, the load engine 102 may identify whether current calibration measurement data 108 or factory calibration measurement data 106 is available, and the calibration engine 104 performs a calibration operation using a selected set of baseline measurements, such as using the factory calibration measurement data 106 when the current calibration measurement data 108 is unavailable. In that example, the calibration engine 104 may cause a color profile to be generated using the factory calibration measurement data 106 where the color profile causes a panel to operate according to a target set of display characteristics 110.

The load engine 102 represents any circuitry or combination of circuitry and executable instructions to perform an inquiry for measurement data and retrieve factory calibration measurement data 106 when current calibration measurement data 108 from a calibration device is unavailable. For example, the load engine 102 may be a combination of circuitry and executable instructions to search for a current calibration measurement data 108 stored on the display device (or identify whether a colorimeter is connected to the display) and load the measurement data 106 from factory calibration operations in preparation to calibrate the display from the native panel performance to target set of display characteristics 110.

Factory calibration measurement data, as used herein, refers to measurement data taken during a calibration operation performed at a manufacturing facility or other factory stage before shipping to an end user. Current calibration measurement data, as used herein, refers to measurement data obtained through user calibration via a calibration instrument, such as when a user attached a personal colorimeter to the display to perform a calibration operation to obtain user calibration measurement data. Measurement data is different from calibration data. As discussed above, the measurement data is a representation of values measured from a display panel. Measurement data may be represented or otherwise converted and still able to directly represent the measurement results. Calibration data is data generated from performing a calculation on or from the measurement data, such as an operation performed in generating a color profile. Measurement data may be available when it is stored on an accessible memory resource or otherwise retrievable, such as through an application service request, a website, or a data server. The current calibration measurement data 108 may be unavailable when (1) the load engine 102 determines a calibration device to be not connected or otherwise inaccessible, (2) when the current calibration measurement data 108 is not stored on the expected memory resource location or otherwise non-existent, or (3) when the current calibration measurement data 108 is corrupt or otherwise not interpretable or retrievable in the appropriate form, as examples. Indeed, an inquiry operation may be a file search, an operation to check a file location, a flag status check operation, a memory read operation (e.g., the expected memory location represents all zeros), an attempt to contact a device, and the like. In an example, the load engine 102 may represent a combination of circuitry and executable instructions to cause an on-screen display (OSD) to present selectable color profile targets, generate the request for panel calibration in response to selection of the target identifier via the OSD, perform a first inquiry operation to identify availability of the current calibration measurement data 108, perform a second inquiry operation to identify availability of factory calibration measurement data 106 on an internal memory resource coupled to the display device; and perform a third inquiry operation to identify availability of factory calibration measurement data 106 on a remote memory resource when the current calibration measurement data 108 is unavailable and the factory calibration measurement data 106 is unavailable from the internal memory resource.

The load engine 102 may represent any circuitry or combination of circuitry and executable instructions to retrieve a target set of display characteristics 110 and store the factory calibration measurement data 106, the current calibration measurement data 108, and/or the target set of display characteristics 110 when such data is retrieved from an external memory resource. In some examples, a user may enter a target display characteristic 110, such as via an OSD menu, and the load engine 102 may execute instructions to cause the user-entered data to be stored for use by the calibration engine 104 to generate a color profile associated with the user-entered display characteristic. For example, the user may provide a specific white point, such as D55, to generate their own custom color profile without downloading a pre-made profile or a pre-determined set of target display characteristics.

The calibration engine 104 represents any circuitry or combination of circuitry and executable instructions to generate a color profile from a native panel performance representation to operate a display according to a target display characteristic 110. For example, the calibration engine 104 may be a combination of circuitry and executable instructions that cause a target set of display characteristics 110 to be received, generate calculated calibration data (such as a LUT) from the native panel performance representation (e.g., the factory calibration measurement data 106) to generate a color profile representing the target set of display characteristics 110, and cause adjustment of a display settings using the color profile generated according to a difference between the target set of display characteristics 110 and the native panel performance representation.

The calibration engine 104 may represents any circuitry or combination of circuitry to calculate calibration data (such as a calculated LUT and a matrix) that represents calculated corrections to process an input video signal that translates the native performance of the panel to perform like the target set of display characteristics 110 based on the factory calibration measurement data 106. A color profile and a target set of display characteristics 110 may include a luminance value, a tone value for a color channel, a range of tone values defining a gamut, a white balance value, a grayscale response value corresponding to all color channels, an optical-electrical transfer function (OETF), electro-optical transfer function (EOTF), an electrical-electrical transfer function (EETF), and/or an inverse-EOTF. For example, the color profile may be represented as a combination of a luminance, a white point value, a gamut, and an OETF value. The calibration engine 104 may cause a color pipeline to be changed. For example, the color profile generated by the calibration engine 104 may be a color pipeline configuration having a LUT representing color corrections between the native panel performance representation and the target set of display characteristics 110, and selection of the color profile may cause the calibration engine 104 to change the color pipeline configuration accordingly and operate the display device using the updated color pipeline. Indeed, execution of the calibration engine 104 may apply a new color profile generated from factory calibration measurement data 106 to operate a corresponding display device at a target set of display characteristics 110.

The calibration engine 104 may perform analysis operations to generate the calculations to determine the color profile from the native panel performance. For example, the calibration engine 104 may be a combination of circuitry and executable instructions to identify a color range representing a target display characteristic, identify a color range representing the native panel performance, compare the first and second range to identify a color channel difference between the native panel performance characteristic and the target display characteristic, and a matrix multiplier with respect to the color channel difference between the target set of display characteristics and the native panel performance characteristics (e.g., the factory calibration measurement data 106).

The load engine 102 and/or the calibration engine 104 may be implemented on an image processor. An image processor represents any circuitry or combination of circuitry and executable instructions to operate a display. For example, an image processor may be circuitry to perform processing operations on image data, such as video data, and cause the processed data to present on a screen of a display device. Examples of an image processor include a video processor, a graphics processing unit (GPU), a scaler, a field-programmable gate array (FPGA), and the like. A scaler, as used herein, is circuitry of a display device that performs scaling of visual output from a host device to the size of the screen of the display device and operates the display device to present the visual output. For example, a scaler may perform image processing operations (such as converting video signal from one display resolution to another) and electrical control operations to coordinate emission of light from pixels to generate a perception of color. In this manner, the image processor may include a processor resource with a specific control program to perform video processing operations, including scaling operations and color profile generation operations.

In some examples, functionalities described herein in relation to any of FIGS. 1-4 may be provided in combination with functionalities described herein in relation to any of FIGS. 5-10.

FIG. 2 depicts the example system 200 may comprise a memory resource 220 operatively coupled to a processor resource 222. Referring to FIG. 2, the memory resource 220 may contain a set of instructions that are executable by the processor resource 222. The memory resource 220 may contain data useable with execution of the set instructions, such as the factory calibration measurement data 206. The set of instructions are operable to cause the processor resource 222 to perform operations of the system 200 when the set of instructions are executed by the processor resource 222. The set of instructions stored on the memory resource 220 may be represented as a load module 202 and a calibration module 204. The load module 202 and the calibration module 204 represent program instructions that when executed cause function of the load engine 102 and the calibration engine 104 of FIG. 1, respectively. The processor resource 222 may carry out a set of instructions to execute the modules 202 and 204 and/or any other appropriate operations among and/or associated with the modules of the system 200.

For example, the processor resource 222 may carry out a set of instructions to, in response to a request for panel calibration and a detection of lack of availability of a calibration device, load factory calibration measurement data 206, generate a LUT for a display based on the loaded factory calibration measurement data 206, and cause a setting color pipeline configuration of the display to change based on the generated LUT derived from the loaded factory calibration measurement data 206.

For another example, the processor resource 222 may carry out a set of instructions to retrieve the factory calibration measurement data 206 from a cloud service using a device identifier associated with a first model identifier, retrieve the target set of display characteristics from the cloud service using a second model identifier, store the factory calibration measurement data 206 and the target set of display characteristics on a memory resource integrated in a display device, identify a first color range corresponding to the target set of display characteristics, identify a second color range corresponding to the native panel performance representation, identify a color channel difference between the native panel performance representation and the target set of display characteristics, modify a matrix multiplier with respect to the color channel difference between the target set of display characteristics and the native panel performance representation, and generate calibration data including a LUT (and a matrix or 3D LUT) that represent calculated corrections to process an input video signal and cause the panel to operate to the target set of display characteristics.

For yet another example, the processor resource 222 may carry out a set of instructions to cause an OSD to present a target identifier to allow for selection of a custom color profile identifier representing the target set of display characteristics, generate the request for panel calibration in response to selection of the target identifier via the OSD, receive a target set of display characteristics corresponding to a target device model, perform an inquiry operation to identify whether current calibration measurement data derived from a calibration instrument coupled to a display device is available, identify whether factory calibration measurement data 206 is available to generate a native panel performance representation (e.g., from an internal memory resource coupled to the display or identify availability of factory calibration measurement data 206 on a remote memory resource associated with a cloud service when the current calibration measurement data is unavailable and the factory calibration measurement data 206 is unavailable from the internal memory resource), and create a custom color profile that matches the target set of display characteristics from the native panel performance representation.

Figure 3:
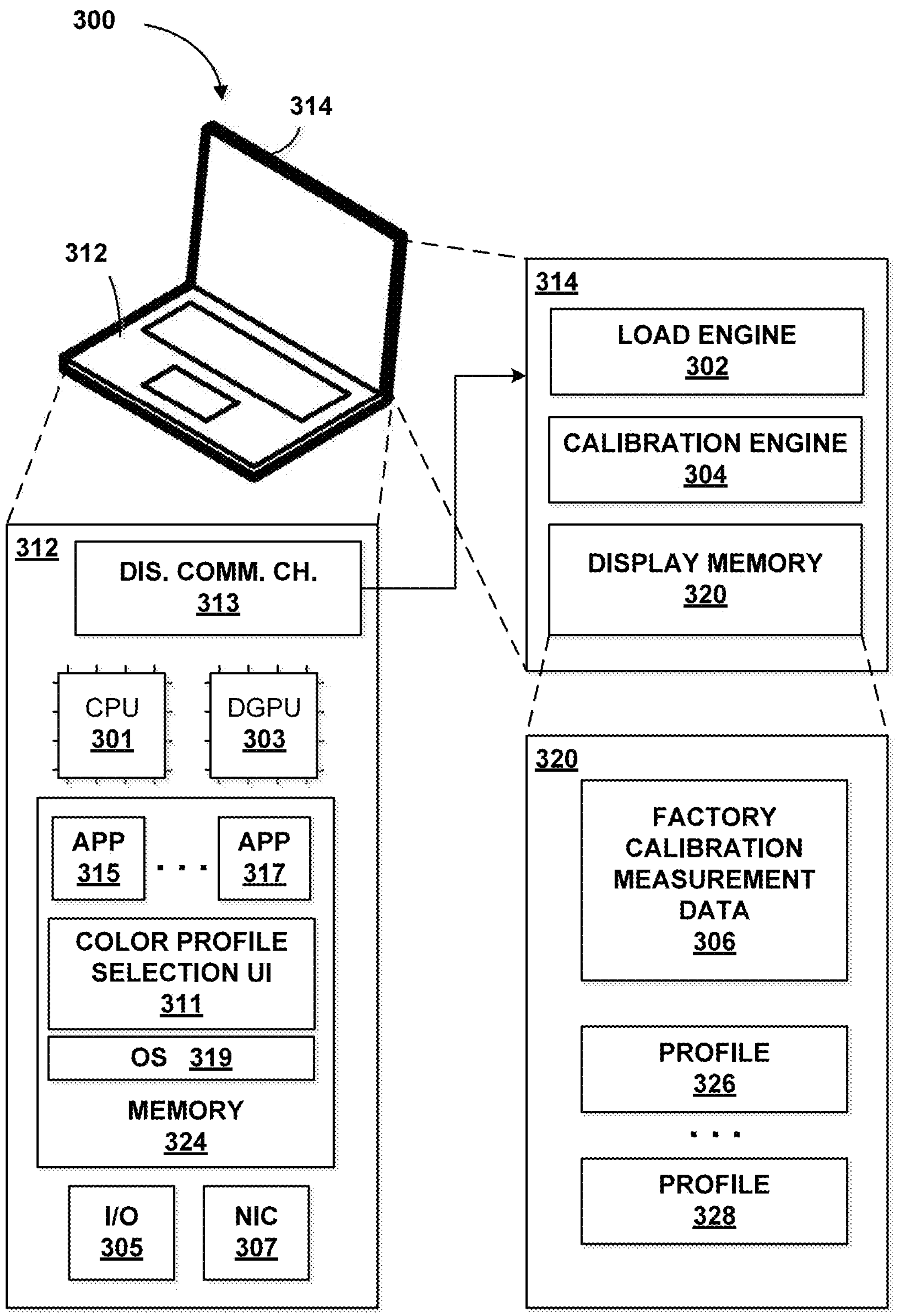
FIGS. 3 and 4 depict example environments in which selected aspects of the present disclosure may be implemented
Figure 4:
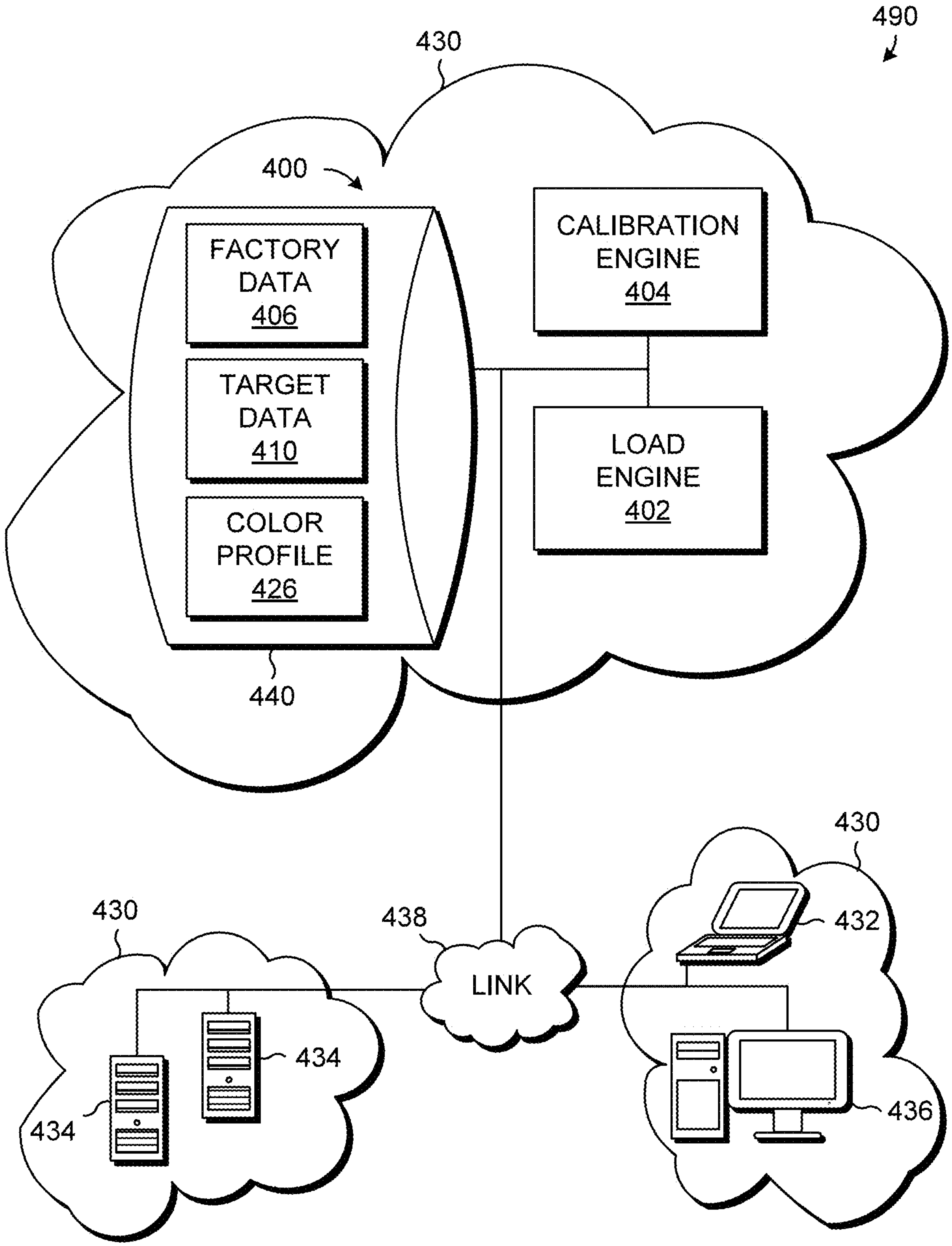
Figure 5:
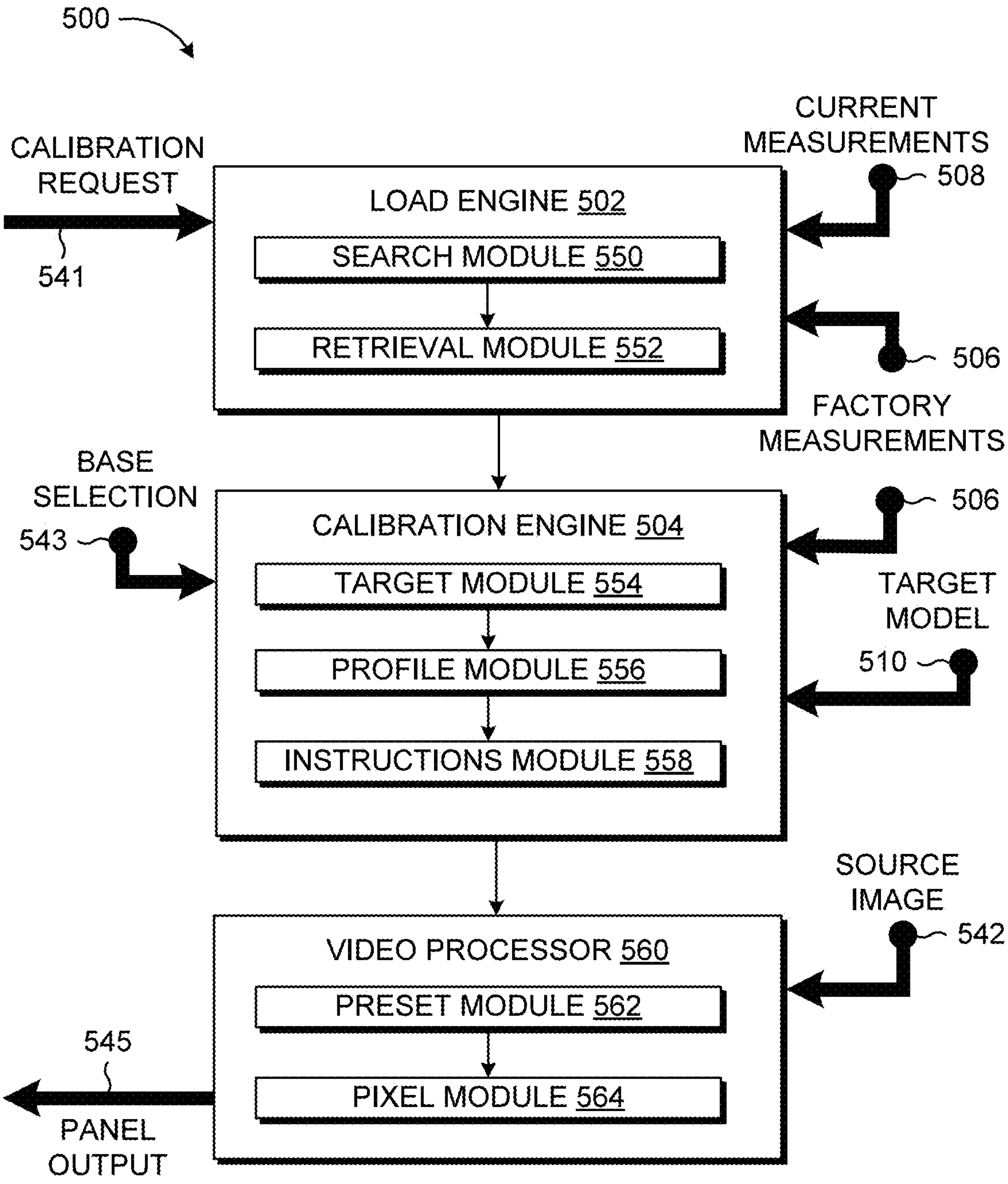
FIG. 5 depicts example components useable to implement example display systems.

Although these particular modules and various other modules are illustrated and discussed in relation to FIG. 2 and other example implementations, other combinations or sub-combinations of modules may be included within other implementations. Said differently, although the modules illustrated in FIG. 2 and discussed in other example implementations perform specific functionalities in the examples discussed herein, these and other functionalities may be accomplished, implemented, or realized at different modules or at combinations of modules. For example, two or more modules illustrated and/or discussed as separate may be combined into a module that performs the functionalities discussed in relation to the two modules. As another example, functionalities performed at one module as discussed in relation to these examples may be performed at a different module or different modules. FIGS. 3-5 depict yet other examples of how functionality may be organized into modules.

A processor resource is any appropriate circuitry capable of processing (e.g., computing) instructions, such as one or multiple processing elements capable of retrieving instructions from a memory resource and executing those instructions. For example, the processor resource 222 may be a central processing unit (CPU) that enables display calibration by fetching, decoding, and executing modules 202 and 204. Example processor resources include at least one CPU, a semiconductor-based microprocessor, a programmable logic device (PLD), and the like. Example PLDs include an application specific integrated circuit (ASIC), a field-programmable gate array (FPGA), a programmable array logic (PAL), a complex programmable logic device (CPLD), and an erasable programmable logic device (EPLD). A processor resource may include multiple processing elements that are integrated in a single device or distributed across devices. A processor resource may process the instructions serially, concurrently, or in partial concurrence.

A memory resource represents a medium to store data utilized and/or produced by the system 200. The medium is any non-transitory medium or combination of non-transitory media able to electronically store data, such as modules of the system 200 and/or data used by the system 200. For example, the medium may be a storage medium, which is distinct from a transitory transmission medium, such as a signal. The medium may be machine-readable, such as computer-readable. The medium may be an electronic, magnetic, optical, or other physical storage device that is capable of containing (i.e., storing) executable instructions. A memory resource may be said to store program instructions that when executed by a processor resource cause the processor resource to implement functionality of the system 200 of FIG. 2. A memory resource may be integrated in the same device as a processor resource or it may be separate but accessible to that device and the processor resource. A memory resource may be distributed across devices.

In the discussion herein, the engines 102 and 104 of FIG. 1 and the modules 202 and 204 of FIG. 2 have been described as circuitry or a combination of circuitry and executable instructions. Such components may be implemented in a number of fashions. Looking at FIG. 2, the executable instructions may be processor-executable instructions, such as program instructions, stored on the memory resource 220, which is a tangible, non-transitory computer-readable storage medium, and the circuitry may be electronic circuitry, such as processor resource 222, for executing those instructions. The instructions residing on a memory resource may comprise any set of instructions to be executed directly (such as machine code) or indirectly (such as a script) by a processor resource.

In some examples, the system 200 may include the executable instructions may be part of an installation package that when installed may be executed by a processor resource to perform operations of the system 200, such as methods described with regards to FIGS. 6-10. In that example, a memory resource may be a portable medium such as a compact disc, a digital video disc, a flash drive, or memory maintained by a computer device, such as a service device 434 of FIG. 3, from which the installation package may be downloaded and installed. In another example, the executable instructions may be part of an application or applications already installed. A memory resource may be a non-volatile memory resource such as read-only memory (ROM), a volatile memory resource such as random-access memory (RAM), a storage device, or a combination thereof. Example forms of a memory resource include static RAM (SRAM), dynamic RAM (DRAM), electrically erasable programmable ROM (EEPROM), flash memory, or the like. A memory resource may include integrated memory such as a hard drive (HD), a solid-state drive (SSD), or an optical drive.

FIGS. 3 and 4 depict example environments in which selected aspects of the present disclosure may be implemented. Referring to FIG. 3, an example computing system 300 is depicted in the form of a laptop computer that includes a computing device 312 or "host" operably coupled with a display 314. In this example, computing device 312 and display 314 are integrated together as a single unit. As an example, the display 314 can be, for instance, pivoted about various angles relative to computing device 312. In other examples, computing device 312 may be a standalone computing device such as a desktop tower, and the display 314 may be a standalone display such as a computer monitor.

In yet other examples, computing system 300 may be formed as a tablet computer or an "all-in-one" computing system in which display 314 and computing device 312 are integrated into a single unit. In yet other examples, computing system 300 in general and/or display 314 in particular may take the form of a head-mounted display ("HMD") that provides an augmented reality (AR) or virtual reality (VR) experience to a wearer.

As shown in the exploded portion at bottom left, computing device 312 may include logic in the form of a CPU 301 and GPU 303. As shown in FIG. 3, in some examples, GPU 303 may be a "discrete" GPU (shown as DGPU 303 in FIG. 3) that is separate and independent from CPU 301. In other examples, the functionalities of CPU 301 and GPU 303 may be combined into a single unit, such as a CPU with integrated graphics. CPU 301 and/or GPU 303 may be operably coupled with various types of memory, collectively represented by memory 324 in FIG. 3. Memory 324 may include, for instance, ROM, RAM, various types of non-volatile memory, etc.

A GPU is a type of logic that is specifically designed to render graphics on a display, often more efficiently and/or powerfully than a standard CPU. Many GPUs are capable of switching between multiple different luminosity ranges. However, as battery-powered devices such as laptop computers and tablet computers have become more powerful, their popularity among graphics enthusiasts has also grown. However, constantly operating a GPU to switch between and/or implement multiple different luminosity ranges uses considerable power, in some instances incurring a battery life penalty.

Memory 324 may include, e.g., in the form of computer-executable instructions loaded in RAM from non-volatile memory, an operating system (OS) 319, a color profile selection user interface ("UI") 311, and various applications (such as applications 315 and 317 in FIG. 3) that may execute on top of OS 319. Color profile selection user interface 311 may be a special application that receives user input to manually select which color calibration profile would like to be used on the display 314. The user input may take various forms, such as user selection of a graphical element of a graphical user interface ("GUI"), a voice command, a gesture, etc. In other examples, color profile selection user interface 311 may be omitted, and color profile selection may be performed using source content metadata without the user being aware of the selection.

Among other things, applications 315 and 317 may include graphics intensive applications and therefore may utilize multiple different luminosity ranges and/or display modes of the display 314. Such graphics-intensive applications may include, for instance, video games, photo editors, animation editors, graphic design applications, movie editors, computer-aided design ("CAD") applications, image compositing applications, color grading applications, and so forth.

The computing device 312 may include other components commonly found in computing devices. As examples, in FIG. 3, computing device includes input/output ("I/O") interface(s) 305 and a network interface card ("NIC") 307. I/O interface(s) 305 may include, for instance, a keyboard, mouse, microphone, digital camera, etc.

In some examples, a display communication channel(s) 313 may be part of I/O interface(s), although it is depicted separately in FIG. 3. Display communication channel(s) may take various forms, such as Video Graphics Array ("VGA"), Digital Visual Interface ("DVI"), High-Definition Multimedia Interface ("HDMI"), DisplayPort ("DP") and/or Embedded DisplayPort ("eDP"), Low-Voltage Differential Signaling ("LVDS"), V-by-One, Universal Serial Bus ("USB"), Display Data Channel Connection Interface ("DDC/CI"), Inter-Integrated Channel ("$I^2C$"), Auxiliary Interface ("AUX"), etc. As shown in FIG. 3, display communication channel(s) 313 may operably couple computing device 312 with display 314.

The display 314 may include logic (such as a load engine 302 and a calibration engine 304 that are the same as the load engine 102 and the calibration engine 104 of FIG. 1) and display memory 320. The display logic may take various forms, such as a timing controller (TCON), a scaler chip or controller, a FPGA, and/or an ASIC. The display memory 320 may take various forms as well, such as those previously mentioned, as well as EEPROM, flash memory, etc.

The display memory 320 may store calibration data such as factory calibration measurement data 306. The display memory 320 may store a plurality of color calibration profiles (or simply "color profiles") corresponding to a plurality of display modes or luminosity ranges. In FIG. 3, for instance, the display memory 320 stores a plurality of color calibration profiles 326 and 328. In various implementations, a memory of a display may be used to store multiple color calibration profiles that correspond to a plurality of luminosity ranges or "display modes," such as standard RGB (sRGB), high dynamic range (HDR), standard dynamic range (SDR), etc.

In various examples, the display logic may determine, e.g., based on a signal received from computing device 312, a current display mode of display 314. For example, on power-up, OS 319 may send a signal to the display logic over display communication channel 313. This signal may include display mode information that indicates which display mode display 314 is supposed to operate in. Display mode information may be contained in various locations of an operating system message, such as in a packet header, video content data, etc. Based on the current display mode of display 314, the display logic may select a given color calibration profile from the plurality of color calibration profiles stored on display memory 320. Using the selected given color calibration profile, the display logic may render image(s) on display 314.

FIG. 4 depicts an example environment in which various example display systems 400 may be implemented. The example environment 490 is shown to include an example system 400 for calibrating a display device. The system 400 (described herein with respect to FIGS. 1 and 2) may represent generally any circuitry or combination of circuitry and executable instructions to calibrate a display device. The system 400 may include a load engine 402 and a calibration engine 404 that are the same as the load engine 102 and the calibration engine 104 of FIG. 1, respectively, and the associated descriptions are not repeated for brevity. As shown in FIG. 4, the engines 402 and 404 may be integrated into a computing device, such as a web server. The engines 402 and 404 may be integrated via circuitry or as installed instructions into a memory resource of the computing device.

The example environment 490 may include compute devices, such as target devices 432, service devices 434, and user devices 436. The target device 432 may operate with a set of display characteristic 410 of a target color profile. A data store 440 may store the target data 410. The service devices 434 represent generally any compute devices to respond to a network request received from a user device 436, whether virtual or real. For example, the service device 434 may operate a combination of circuitry and executable instructions to provide a network packet in response to a request for a page or functionality of an application. The user devices 436 represent generally any compute devices to communicate a network request and receive and/or process the corresponding responses. For example, a browser application may be installed on the user device 436 to receive the network packet from the service device 434 and utilize the payload of the packet to display an element of a page via the browser application. The user device 436 may include a display device with an identifier, such as a serial number, that corresponds to a native panel performance representation stored on the service device 434. For example, the factory calibration measurement data 406 taken during factory calibration of the display device of user device 436 may be stored on data store 440.

The compute devices may be located on separate networks 430 or part of the same network 330. The example environment 490 may include any appropriate number of networks 430 and any number of the networks 430 may include a cloud compute environment. A cloud compute environment may include a virtual shared pool of compute resources. For example, networks 430 may be distributed networks comprising virtual computing resources. Any appropriate combination of the system 400 and compute devices may be a virtual instance of a resource of a virtual shared pool of resources. The engines and/or modules of the system 400 herein may reside and/or execute "on the cloud" (e.g., reside and/or execute on a virtual shared pool of resources).

A link 438 generally represents one or a combination of a cable, wireless connection, fiber optic connection, or remote connections via a telecommunications link, an infrared link, a radio frequency link, or any other connectors of systems that provide electronic communication. The link 438 may include, at least in part, intranet, the Internet, or a combination of both. The link 438 may also include intermediate proxies, routers, switches, load balancers, and the like.

The data store 426 may contain information utilized by the engines 402 and 404. For example, the data store 406 may store factory calibration measurement data 406, a target set of display characteristics 410, and a color profile 426 generated by the calibration engine 404 using the factory calibration measurement data 406 and the target set of display characteristics 410.

Referring to FIGS. 1-4, the engines 102 and 104 of FIG. 1, the modules 202 and 204 of FIG. 2, the logic of the display 314 (represented as the engines 302 and 304) of FIG. 3, and the engines 402 and 404 of FIG. 4 may be distributed across devices 432, 434, 436, or a combination thereof. The engine and/or modules may complete or assist completion of operations performed in describing another engine and/or module. For example, the calibration engine 404 of FIG. 4 may request, complete, or perform the methods or operations described with the calibration engine 104 of FIG. 1 as well as the load engine 102 of FIG. 1. Thus, although the various engines and modules are shown as separate engines in FIGS. 1-4, in other implementations, the functionality of multiple engines and/or modules may be implemented as a single engine and/or module or divided in a variety of engines and/or modules. In some example, the engines of the system 400 may perform example methods described in connection with FIGS. 5-10.

FIG. 5 depicts example components useable to implement example display systems 500. Referring to FIG. 5, the example components of FIG. 5 generally include a load engine 502, a calibration engine 504, and a video processor 560. The load engine 502 and the calibration engine 504 represent engines similar to the load engine 102 and the calibration engine 104 of FIG. 1. The example components of FIG. 5 may be implemented on a compute device, such as a display device or a service device 434 of FIG. 4.

A calibration request 541 is received by the display system 500. In response to the calibration request 541, the load engine 502 is activated to retrieve a native panel performance representation. The load engine 502 includes program instructions, such as a search module 550 and a retrieval module 552, to assist determining whether current calibration measurement data 508 is available and loading a native panel performance representation based on what measurement data is available.

The search module 550 represents program instruction that when executed cause a processor resource to perform an inquiry operation to retrieve measurement data. Execution of the search module 550 may cause the processor resource to search for factory calibration measurement data 506 and/or identify whether a calibration instrument is available.

The retrieval module 552 represents program instruction that when executed cause a processor resource to retrieve the measurement data from any available sources, such as factory calibration measurement data 506 from a memory resource coupled to a display device or current calibration measurement data 508 generated from a calibration instrument coupled to the display device.

The calibration engine 504 includes program instructions (such as a target module 554, a profile module 556, and an instructions module 558) to assist generating a color profile from factory calibration measurement data 506 when current calibration measurement data 508 is not available.

The target module 554 represents program instruction that when executed cause a processor resource to determine a target set of display characteristics. For example, execution of the target module 554 may cause the processor resource to download a target set of display characteristics from a cloud service using a target model identifier 510. A target model identifier 510, as used herein, may be any number, character, string, or other value capable of representing a model or other classification representative of a group or type of display devices.

The profile module 556 represents program instruction that when executed cause a processor resource to generate a color profile from the measurement data and corrections to produce the target set of display characteristics corresponding to the target model identifier 510. Execution of the profile module 556 may cause the processor resource to identify whether to use the factory calibration measurement data 506 or the current calibration measurement data 508 based on a base selection 543. For example, a user may choose to select factory calibration measurement data 506 as the base native panel performance over current calibration measurement data 508 generated from a low-quality calibration instrument.

The instructions module 558 represents program instruction that when executed cause a processor resource to generate instructions to cause the display device to apply the color profile generated via execution of the profile module 556.

The video processor 560 includes program instructions, such as a preset module 562 and a pixel module 564, to assist causing a display device to operate a panel using a color profile corresponding to factory calibration measurement data when the factory calibration measurement data is available.

The preset module 562 represents program instruction that when executed cause a processor resource to generate a selection of presets including the color profile generated via execution of the profile module 556. Indeed, the video processor 560 may offer an OSD with color profile selections to allow switching between different color pipeline configurations and color profiles to operate the display to show source imagery at different sets of display characteristics.

The pixel module 564 represents program instruction that when executed cause a processor resource to generate pixel-specific data from the source image 542 using the selected color preset, such that the source image 542 is to be produced as panel output 545 in the target set of display characteristics associated with the target model identifier 510.

In some examples, the modules of the load engine 502 and the modules of the calibration engine 504 are implemented as part of the video processor 560 and the video processor 560 may be a scaler integrated on a display device or a GPU.

Figure 6:
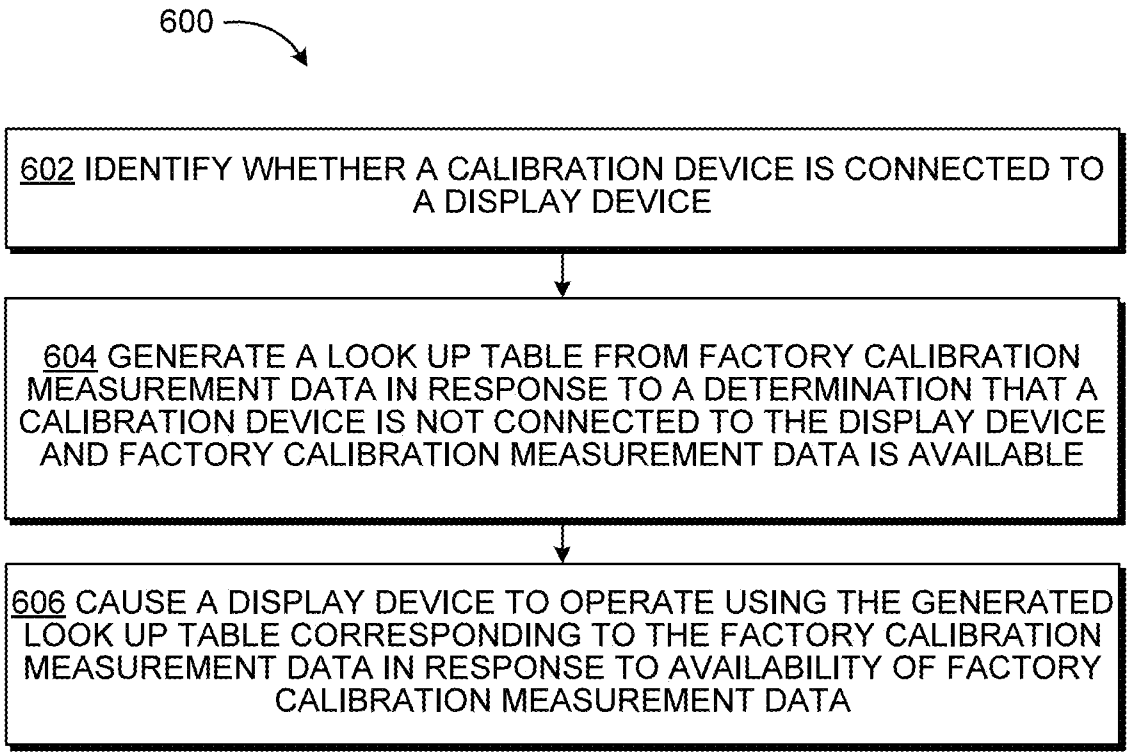
FIGS. 6-10 are flow diagrams depicting example methods of selected aspects of the present disclosure.

FIGS. 6-10 are flow diagrams depicting example methods 600-1000 of calibrating a display device. Referring to FIG. 6, example method 600 of calibrating a display device may generally comprise identifying whether a calibration device is connected, generating a LUT from factory calibration measurement data, and causing a display device to operate using the generated LUT. The method 600 may be performed by a load engine and calibration engine, such as a load engine 102 and a calibration engine 104 of FIG. 1.

At block 602, an operation is executed to identify whether a calibration device is connected to a display device. For example, a processor resource may cause a message to be transferred over an input/output bus to indicate connection of an operational calibration device, such as a request of an acknowledgement of being connected. For another example, an inquiry operation may include making a request for measurement data generated and stored on a memory resource of the calibration device.

At block 604, an LUT is generated from factory calibration measurement data in response to a determination that the calibration device is not connected to the display device and a determination that factory calibration measurement data is available to use as a baseline native panel performance. For example, a processor resource may retrieve status of existence of measurement data, such as checking flag status for memory locations designated for the current calibration measurement data and the factory calibration measurement data, and, in response to a flag indicating factory calibration measurement data is available and a flag indicating current calibration measurement data is not available, load the factory calibration measurement data in preparation to generate a LUT to display a target set of display characteristic from the factory calibration measurement data.

At block 606, a display device is caused to operate a panel using the LUT (corresponding to the factory calibration measurement data) generated at block 604. For example, a processor resource may send an instruction to a video processor (or a video processor may send electrical signals to a panel) to cause operation of a panel of a display device using a color profile generated from factory calibration measurement data in response to generation of the LUT when factory calibration measurement data is available.

Figure 7:
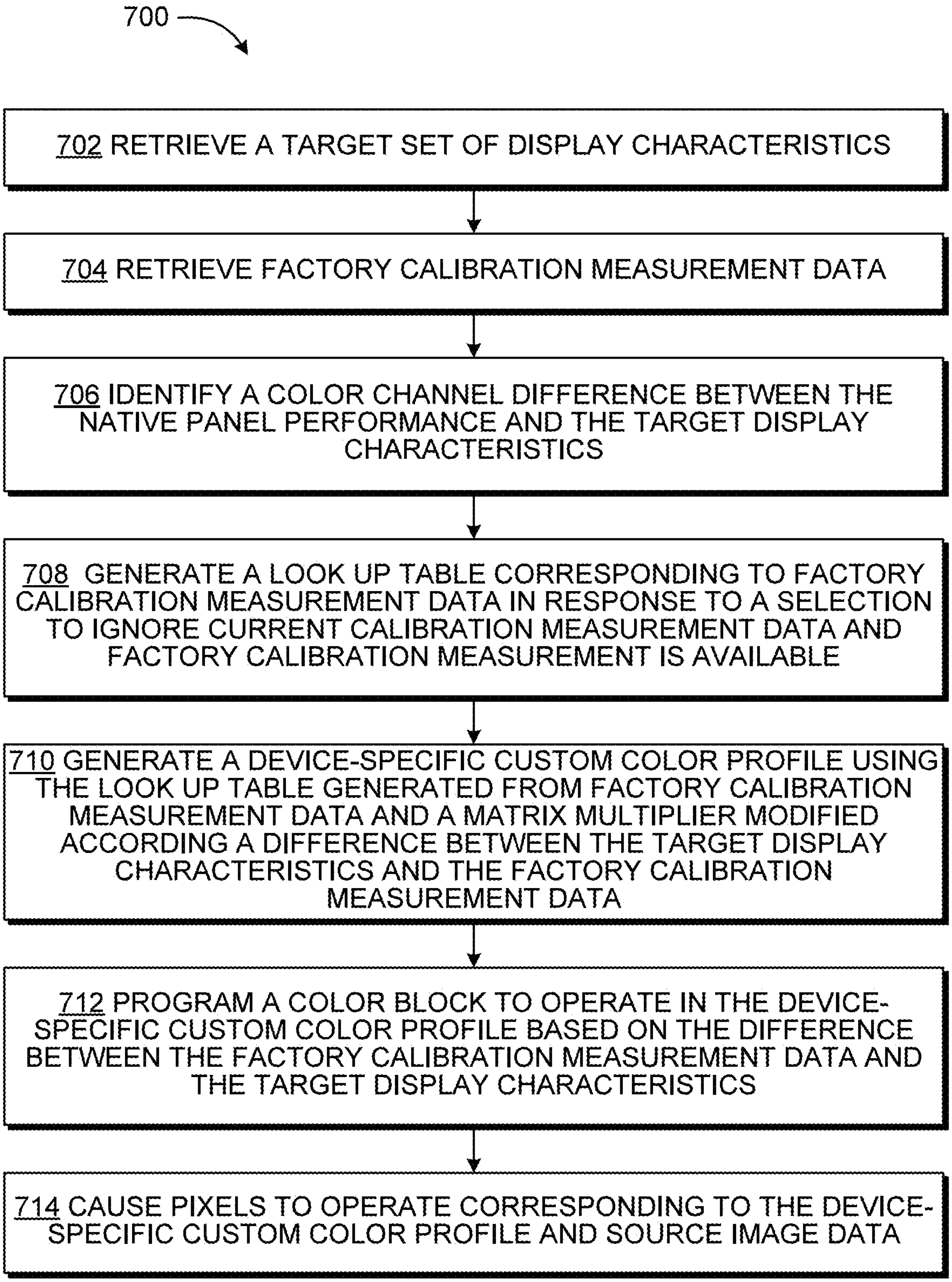

FIG. 7 is a flow chart of example method 700 of calibrating a display device that includes blocks similar to blocks of FIG. 6 and provides additional blocks and details. In particular, FIG. 7 depicts additional blocks and details generally regarding translating native panel performance to a target set of display characteristics. Blocks 706 and 714 are similar to blocks 604 and 606 of FIG. 6, respectively, and, for brevity, their respective descriptions are not repeated in their entirety.

At block 702, a target set of display characteristics is retrieved. The target display characteristics may be stored integral to the display, on a peripheral memory resource connectable to the display, or retrievable over a network connection, such as from an online or cloud service. The target set of display characteristics represent the display panel properties to be mimicked by implemented a color profile on the display device. At block 704, factory calibration measurement data is retrieved. As discuss herein, the factory measurement data may also be stored internal or otherwise integrated to the display, stored on a peripheral memory resource connectable to the display, or retrievable over a network connection.

At block 706, a color channel difference is identified between the native panel performance (as represented by the factory calibration measurement data) and the target display characteristics. The color channel difference may be used to calculate color corrections or otherwise generate a LUT and/or matrix at block 708.

Indeed, at block 708, a LUT is generated from the factory calibration measurement data in response to a selection to ignore current calibration measurement data (and the factory calibration measurement data is available). Such a feature may be useful when a user has attempted to calibrate the display device with an inaccurate or low-quality calibration device and the user has preference for the factory calibration measurement data over the current calibration measurement data. In that example, a user selection may generate a flag that represents ignoring any current calibration measurement data (e.g., use factory calibration measurement data even when current calibration measurement data is available) when generating a color profile during a calibration process. At block 710, a device-specific custom color profile is generated using the LUT generated at block 708. The operations of generating a custom color profile based on factory calibration measurement data instead of using the current calibration measurement data generated from the calibration device may be performed in response to a determination that the current calibration measurement data is elected to be ignored. Other color profile information may be generated at block 710. For example, a device-specific custom color profile is generated using the LUT generated from a difference between the target set of display characteristics and the factory calibration measurement data and generated from a matrix multiplier modified according to the difference between the target set of display characteristics and the factory calibration measurement data.

At block 712, a color block is programmed to operate in the device-specific custom color profile generated at block 710. For example, such as with reference to FIG. 3, display logic may program color block of the display device with the selected color calibration profile and render visual content on a matrix of pixels in real time using the content of a color block. Based on the display mode, the logic may select from a plurality of color calibration profiles (such as the color profile generated at block 710) stored on display memory. The display logic may cause further instructions, such as cause a TCON to perform detecting a target display mode or luminosity range of the display device, select a color calibration profile (based on the detected target display mode, the target set of display characteristics, and the factory calibration measurement data), and program the selected color calibration profile into the color block.

At block 714, pixels of a panel of a display device are caused to operate corresponding to the device-specific custom color profile and the source image data. For example, a processor resource may cause the source image data to be processed through a color block or other color pipeline process to generate signals that cause subpixels of a panel to display colors from native performance to a target set of display characteristics via modification of a matrix multiplier based on the factory calibration measurement data and operating the pixels of the panel using the modified matrix multiple and the LUT generated from the factory calibration measurement data.

Figure 8:
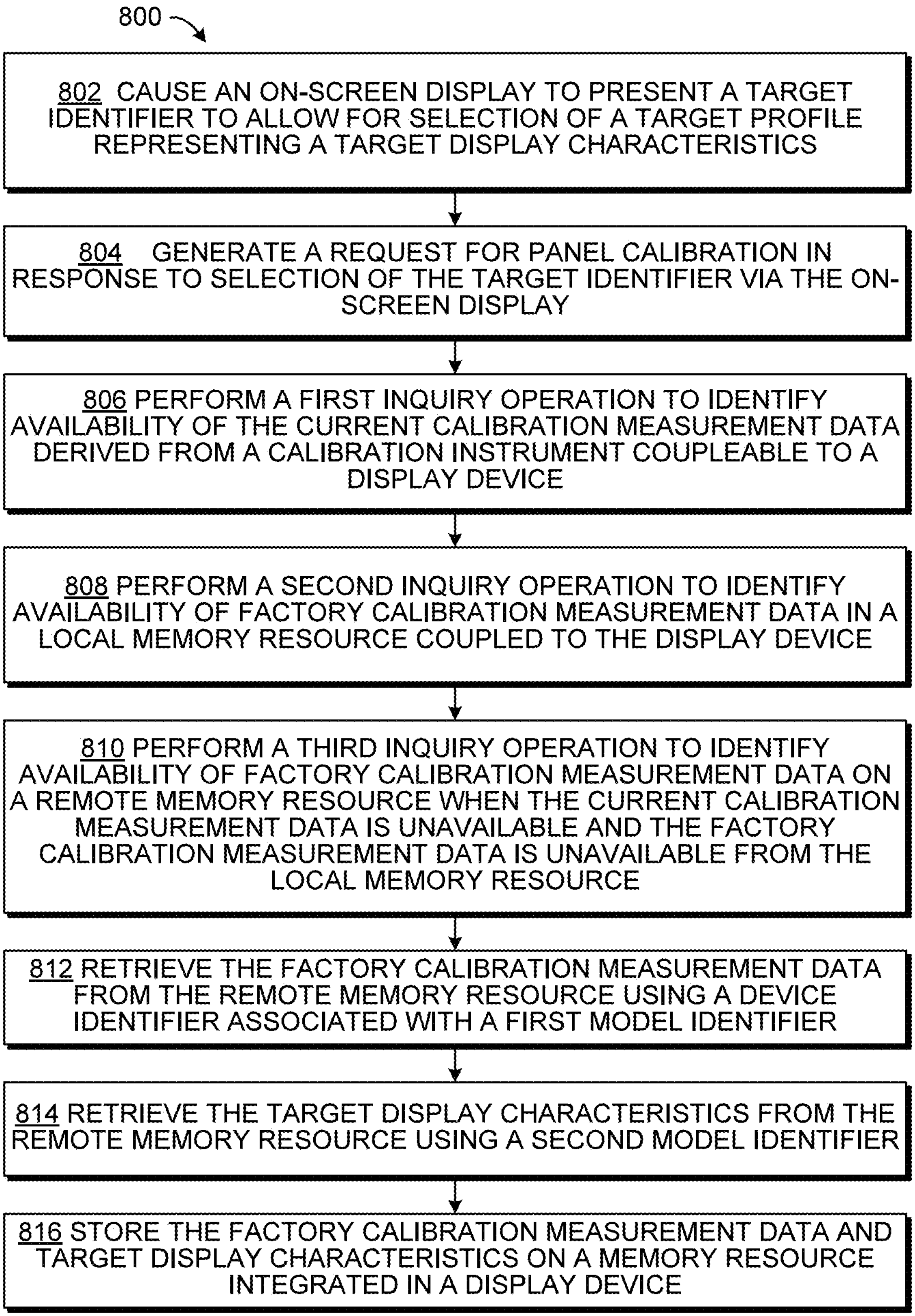

FIG. 8 is a flowchart of an example method 800 of retrieving measurement data. The example method 800 may generally comprise performing inquiries as to what measurement data is retrievable, retrieving the available measurement data, and storing the measurement data so that it is available for calibration operations. Example method 800 may be used in conjunction with methods 600 or 700 and may be implemented by a load engine and calibration engine, such as the display system 100 of FIG. 1.

At block 802, an OSD is caused to present a target identifier to allow for selection of a target profile representing a target set of display characteristics. In this manner, an OSD menu may allow for selecting a desired color profile, including a color profile that may not be loaded on the display device yet.

At block 804, a panel calibration request is generated in response to selection, via the OSD, of a target identifier. In particular, a request for panel calibration of a target identifier of a color profile that is not loaded on the display device for operation yet and searching for data to generate the profile may be performed at blocks 806-816.

At block 806, a first inquiry operation is performed to identify availability of the current calibration measurement data derived from a calibration instrument coupleable to a display device. The inquiry operation has been discussed herein, such as examples of determining whether a calibration device is connected to a display device or if the data from a calibration device is stored or otherwise available to the display device.

At block 808, a second inquiry operation is performed to identify availability of factory calibration measurement data in a local memory resource coupled of the display device. A local memory resource may include an internal memory resource of a display device, such as memory attached to the scaler of a computer monitor as well as a locally connected flash drive or other memory resource coupled to the display device.

At block 810, a third inquiry operation is performed to identify availability of factory calibration measurement data on a remote memory resource when the current calibration measurement data is unavailable and the factory calibration measurement data is unavailable from a local memory resource. For example, if current calibration measurement data is not available and a copy of the factory calibration measurement data is not already stored locally on the display device, a request may be generated to retrieve a copy of the factory calibration measurement data from a remote memory resource associated with a cloud service, and thus allow for retrieval of a representation of native panel performance from any location. At block 812, the factory calibration measurement data is retrieved from the remote memory resource using a first model identifier associate with a device identifier corresponding to the display device to be calibrated. At block 814, the target set of display characteristics is retrieved from the remote memory resource using a second model identifier, such as a model identifier of a device model that is different from the display device to which the factory calibration measurement data corresponds. The operations of blocks 812 and 814 may be retrieval from a database of measurement data and target display characteristics that uses serial numbers, model numbers, and other classifications that are retrievable using model identifier values.

At block 816, the factory calibration measurement data and the target set of display characteristics are stored on a memory resource integrated in a display device. For example, the measurement data from the factory and target display characteristics are downloaded from a cloud service onto internal memory of the display device for retrieval to perform calibration operations, such as calibration operations discussed in example methods 600, 700, and 900.

Figure 9:
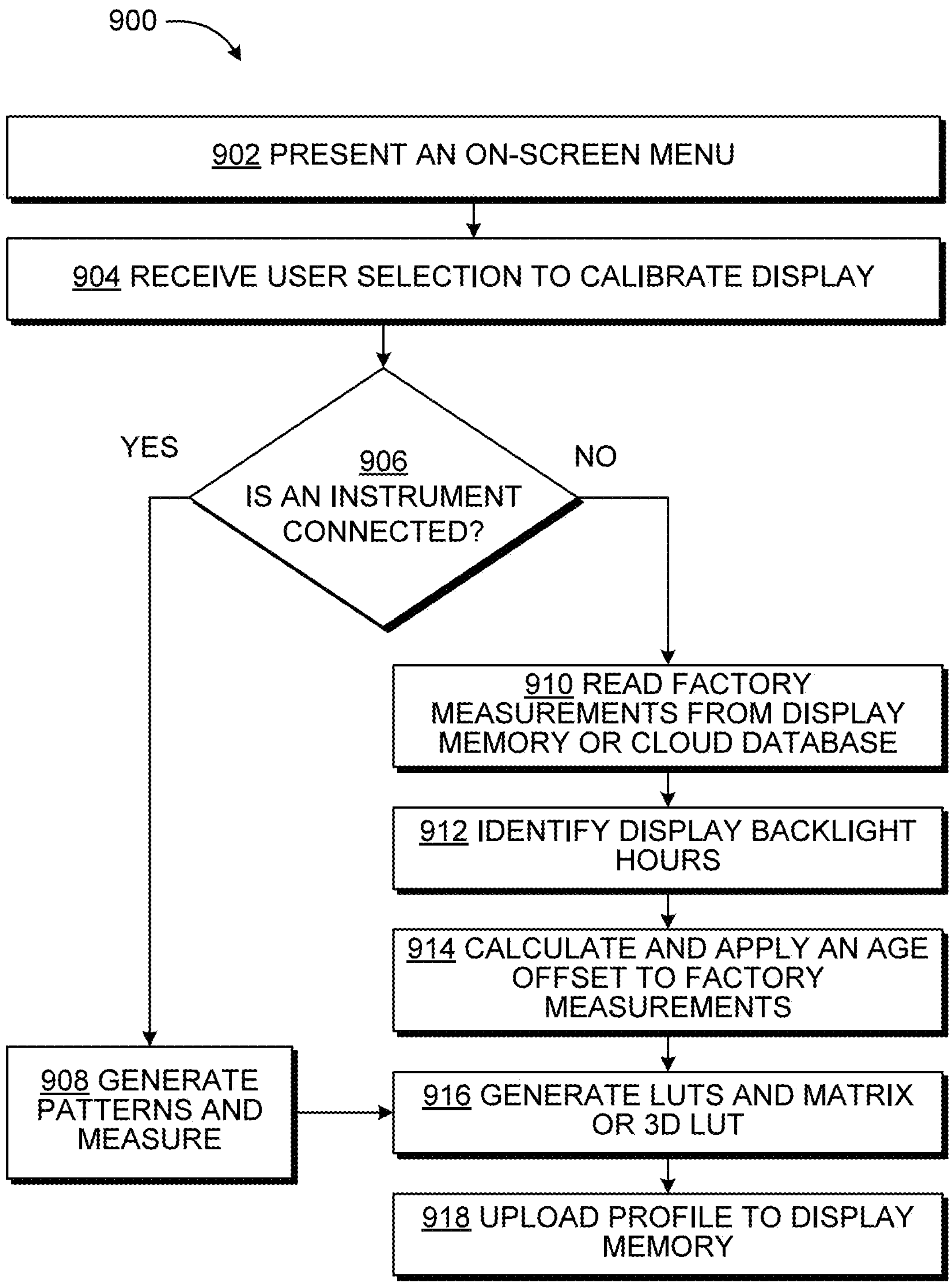

FIG. 9 is a flowchart of an example method 900 of calibrating a display device. The example method 900 of calibrating a display device generally includes receiving a calibration request, checking for a calibration device, identifying the age of the display, and generating a profile using the display age and factory calibration measurement data when a calibration device is not available. The operations performed by the blocks of method 900 may be implemented by a display system with a load engine and a calibration engine, such as the display system 100 of FIG. 1.

At block 902, an on-screen menu is presented, and, a user selection is received indicating a desire to calibrate a display device at block 904.

In response to receiving a calibration request, a verification is made to identify whether an instrument is connected to the display device at block 906. If a calibration instrument is connected to the device, patterns are generated on the display and measured by the calibration instrument at block 908. At block 916, an LUT and matrix or 3D LUT is generated to produce a color profile and the color profile is uploaded to memory at block 918.

If no calibration instrument is identified at block 906, then factory calibration measurement data is read from display memory or a cloud database at block 910. At block 912, an age of the display is determined. For example, a processor resource may track or otherwise identify a number of hours of operation corresponding to the backlight of the display. The number of hours may represent an age of the display. As used herein, an age of the display may represent a time period from the manufacturing data or an amount of usage of the display, which may include hours and/or intensity of backlight operation. At block 914, an age offset is calculated from the display backlight hours identified at block 912 and the age offset is applied to the factory calibration memory in generation of the LUTs and matrix (or 3D LUT) at block 916. At block 918, the profile generated from the calibration data generated at block 916 is uploaded to display memory. The new color profile may also be uploaded to a remote memory resource, such as onto a cloud service database.

While the display ages, any calibration made using the factory measurement data may gradually become less accurate (which is why user calibration with an external instrument is generally recommended). That said, a generated calibration using the original factory data may be as accurate as the original factory calibrations and an age offset may improve the color profile accuracy, as an example.

Figure 10:
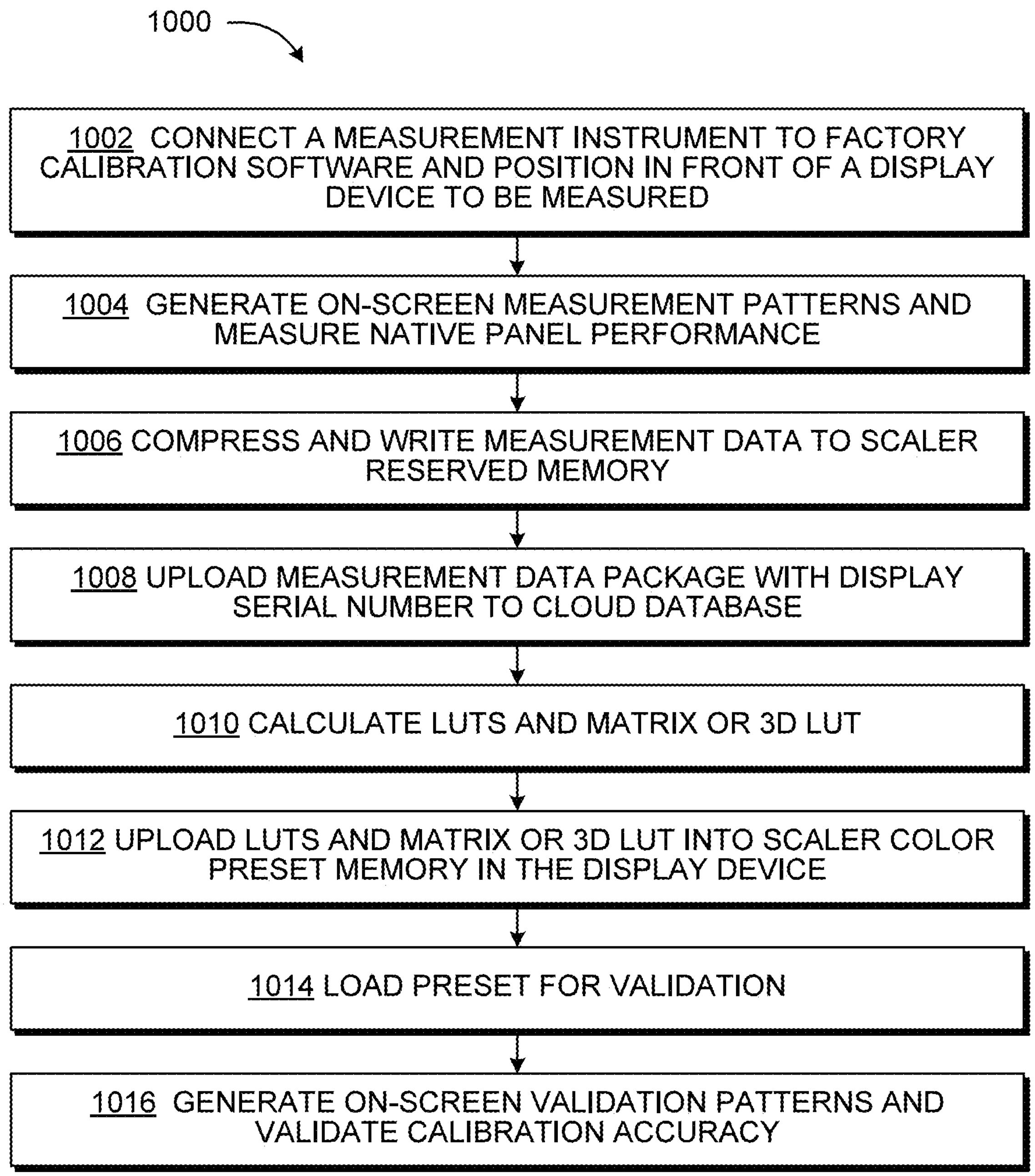

FIG. 10 is a flowchart of an example method 1000 of calibrating a display device at a factory may generally comprise writing measurement data to a storage location and validating the calibration.

At block 1002, a measurement instrument is connected to a factory calibration software and the factory measurement instrument is positioned in front of the device to be measured. At block 1004, on-screen patterns are generated on a panel of a display device and the native panel performance is measured by the factory calibration software and factory measurement instrument.

At block 1006, the factory calibration measurement data generated by the factory measurement instrument is written to scaler reserved memory in raw, uncompressed form (or in a compressed form when the scaler memory is limited). At block 1008, the same, raw factory calibration measurement data is uploaded with a corresponding display device serial number to a cloud database for later retrieval when performing user calibration by the end user.

The measurements are then validated. At block 1010, a LUT and matrix or 3D LUT are calculated and, at block 1012, the LUT and matrix or 3D LUT is uploaded into the scaler preset memory in the display device. The profile is set as a color profile preset available on the OSD of the display device and the color preset is loaded for validation at block 1014. At block 1016, on-screen validation patterns are generated, and the calibration accuracy is validated. If the calibration is not valid (e.g., the color profile is inaccurate according to the validation readings), then the process is repeated, and the stored factory calibration measurement data is replaced on the scaler memory and the cloud database. Factory default values for the color presets may be, thus, generated at the factory and stored on the display device and/or a cloud database. The factory color settings may be stored separately from the active color settings to allow a user to reset the display to the original factory configuration or the color pipeline (e.g., resort the original facotry0created color presets), but also allow the factory calibration measurement data to remain on the display In this manner, the factory calibration measurement data is useable in user calibration operations for the life of the display and customers may avoid purchase of a calibration instrument, for examples.

Although the flow diagrams of FIGS. 5-10 illustrate specific orders of execution, the execution order may differ from that which is illustrated. For example, the execution order of the blocks may be scrambled relative to the order shown. Also, the blocks shown in succession may be executed concurrently or with partial concurrence. All such variations are within the scope of the present description.

All the features disclosed in this specification (including any accompanying claims, abstract and drawings), and/or all the elements of any method or process so disclosed, may be combined in any combination, except combinations where at least some of such features and/or elements are mutually exclusive.

The terms "include," "have," and variations thereof, as used herein, mean the same as the term "comprise" or appropriate variation thereof. Furthermore, the term "based on," as used herein, means "based at least in part on." Thus, a feature described as based on some stimulus may be based only on the stimulus or a combination of stimuli including the stimulus. The article "a" as used herein does not limit the element to a single element and may represent multiples of that element. Furthermore, use of the words "first," "second," or related terms in the claims are not used to limit the claim elements to an order or location, but are merely used to distinguish separate claim elements.

The present description has been shown and described with reference to the foregoing examples. It is understood that other forms, details, and examples may be made without departing from the spirit and scope of the following claims.

What is claimed is:

1. A display system comprising:

a load engine to, in response to a calibration request initiated by user selection of a desired color profile target, retrieve factory calibration data as a native panel performance representation; and a calibration engine to perform a calibration operation in response to the calibration request, including to:

receive a target set of display characteristics corresponding to the desired color profile target;

generate a color profile from the native panel performance representation to operate a display according to the target set of display characteristics; and cause, using the generated color profile, adjustment of a display according to a relationship between the target set of display characteristics and the native panel performance representation.

2. The display system of claim 1, wherein the factory calibration data is stored on an internal memory resource of the display system or retrieved from an external memory resource.

3. The display system of claim 2, wherein the external memory resource is a cloud-accessible database.

4. The display system of claim 2, wherein the external memory resource is located on a separate device in communication with the display system.

5. The display system of claim 1, further comprising a panel, wherein the calibration engine is to generate calibration data that translates the factory calibration data of the panel to perform like the target set of display characteristics.

6. The display system of claim 5, wherein the calibration data is a calculated look up table and a matrix that represents calculated corrections to process an input video signal and cause the panel to operate to the target set of display characteristics.

7. The display system of claim 1, wherein the target set of display characteristics includes a luminance value, a range of tone values defining a gamut, a white balance value, a grayscale response value corresponding to all color channels, or a transfer function; and the generated color profile is a color pipeline configuration having a look up table representing color corrections between the native panel performance representation and the target set of display characteristics.

8. A non-transitory computer-readable storage medium (NTCRSM) comprising a set of instructions executable by a processor resource to:

in response to a request for calibration of a device and a detection of lack of availability of a calibration device, load factory calibration data;

generate calibration data for the device based on the loaded factory calibration data; and cause a configuration of the device to change based on the generated calibration data derived from the loaded factory calibration data.

9. The NTCRSM of claim 8, wherein the calibration of the device is a panel calibration of a display device.

10. The NTCRSM of claim 9, wherein the calibration data is in the form of a look up table.

11. The NTCRSM of claim 9, wherein the set of instructions is executable by the processor resource to:

receive a target set of display characteristics corresponding to a target device model;

generate a native panel performance representation based on the factory calibration data; and create a custom color profile that matches the target set of display characteristics from the native panel performance representation.

12. The NTCRSM of claim 11, wherein the set of instructions is executable by the processor resource to:

identify a first color range corresponding to the target set of display characteristics;

identify a second color range corresponding to the native panel performance representation;

identify a color channel difference between the native panel performance representation and the target set of display characteristics; and modify a matrix multiplier with respect to the color channel difference between the target set of display characteristics and the native panel performance representation.

13. The NTCRSM of claim 12, wherein the set of instructions is executable by the processor resource to:

cause an on-screen display to present a target identifier to allow for selection of the custom color profile representing the target set of display characteristics;

generate the request for panel calibration in response to selection of the target identifier via the on-screen display;

perform a first inquiry operation to identify availability of the factory calibration data on a local memory resource coupled to the display device; and perform a second inquiry operation to identify availability of the factory calibration data on a remote memory resource associated with a cloud service when the factory calibration data is unavailable from the local memory resource.

14. The NTCRSM of claim 8, wherein the set of instructions is executable by the processor resource to retrieve the factory calibration data from a cloud service using a device identifier associated with a first model identifier.

15. A method of calibrating a display device, the method comprising:

receiving a request for panel calibration of a display device after factory calibration in response to a user selection of a desired color profile target;

retrieving factory calibration data from a memory resource;

generating, via a processor resource, a look up table (LUT) from the factory calibration data corresponding to the display device; and causing, via the processor resource, the display device to operate a panel using the generated LUT corresponding to the factory calibration data.

16. The method of claim 15, comprising:

determining an age of the display device;

applying age offset to the factory calibration data when generating the LUT;

modifying a matrix multiplier based on the factory calibration data; and operating pixels of a panel using the modified matrix multiplier and the LUT generated from the factory calibration data.

17. The method of claim 15, comprising:

retrieving a target set of display characteristics to mimic; and generating a device-specific custom color profile using the LUT generated from a relationship between the target set of display characteristics and the factory calibration data and a matrix multiplier modified according to the relationship between the target set of display characteristics and the factory calibration data.

18. The method of claim 17, comprising:

programming a color block to operate in the device-specific custom color profile based on the factory calibration data and the target set of display characteristics; and operating pixels of a panel corresponding to the device-specific custom color profile and source image data.

19. The method of claim 15, further comprising:

determining whether current calibration data from a calibration device is selected to be ignored; and, in response to the determination that the current calibration data is selected to be ignored, generating a custom color profile based on the factory calibration data instead of using current calibration data generated from the calibration device.

20. The method of claim 15, further comprising:

causing an on-screen display (OSD) to present selectable color profile targets to a user, including the desired color profile target; and generating the request for panel calibration in response to the selection of the desired color profile target via the OSD.

* * * * *